(12) United States Patent
Ahn et al.

(10) Patent No.: US 7,211,331 B2
(45) Date of Patent: May 1, 2007

(54) PREPARATION OF NANO-SIZED ORGANIC-INORGANIC COMPOSITE MATERIAL

(76) Inventors: Kyung Hyun Ahn, Gaepo 4-cha Woosung Apt. 8-507, #465, Dogok-dong, Kangnam-gu, Seoul (KR) 135-270; Seung Jong Lee, Mokdong Hyundai Apt. 101-1701, Sinjeong-2-dong, Yangcheon-gu, Seoul (KR) 158-072

( * ) Notice: Subject to any disclaimer, the term of this patent is extended or adjusted under 35 U.S.C. 154(b) by 126 days.

(21) Appl. No.: 10/486,261

(22) PCT Filed: Aug. 8, 2002

(86) PCT No.: PCT/KR02/01511

§ 371 (c)(1), (2), (4) Date: Feb. 3, 2004

(87) PCT Pub. No.: WO03/016208

PCT Pub. Date: Feb. 27, 2003

(65) Prior Publication Data

US 2004/0191549 A1    Sep. 30, 2004

(30) Foreign Application Priority Data

Aug. 18, 2001 (KR) .................. 2001-49793

(51) Int. Cl.
*B32B 27/00* (2006.01)
*B32B 27/32* (2006.01)

(52) U.S. Cl. .............. 428/500; 523/300; 524/445; 524/447; 524/448; 524/449

(58) Field of Classification Search .......... 428/500; 523/300; 524/445, 447, 448, 449
See application file for complete search history.

(56) References Cited

U.S. PATENT DOCUMENTS 5,645,758 A * 7/1997 Kawasumi et al. .... 252/299.01

* cited by examiner

*Primary Examiner*—Kriellion Sanders
(74) *Attorney, Agent, or Firm*—Anderson Kill & Olick, PC

(57) ABSTRACT

A nano-sized composite material of a polymer resin and a layered clay composite having improved properties can be prepared by a simple and economic process comprising applying an electric field thereto.

7 Claims, 9 Drawing Sheets

PREPARATION OF NANO-SIZED ORGANIC-INORGANIC COMPOSITE MATERIAL

FIELD OF THE INVENTION

The present invention relates to a method for improving the properties, e.g., mechanical strength, heat resistance and fire retardancy, of a nano-sized composite material composed of a polymer resin and a layered clay composite dispersed therein, by way of applying an electric field to the composite material.

BACKGROUND OF THE INVENTION

It has recently become known that an organic-inorganic composite material prepared by dispersing a clay composite having an interlayer distance of several nanometers, e.g., by ion exchange with an organic salt, into a polymer resin and processing the mixture, exhibits high mechanical strength and heat resistance suitable for use in the manufacture of automotive, aircraft and building components.

However, the addition of a clay composite to a polymer does not always give the above-mentioned effect, and such composite product with improved characteristics can be obtained only in very limited cases, e.g., in 1) a case that a layered clay composite is added to a monomer and/or oligomer of a resin during a polymerization step (see U.S. Pat. No. 4,889,885; and [A. Usuki et al., *J. Mater. Res.*, vol. 8 (1993), p1179]), and 2) a case that a layered clay composite is added to a copolymer of polypropylene and anhydrous maleic acid during an extruding step (see [M. Kato et al., *J. Appl. Polym. Sci.*, vol. 66 (1997), p1781]).

However, the method of case 1) has the disadvantage that it is very difficult to uniformly disperse the clay composite into the polymer matrix, resulting in poor product quality. As to the method of case 2), the use of an expensive polymer, i.e., the copolymer of polypropylene and anhydrous maleic acid, causes the problem of a high manufacture cost.

Hitherto, there has not been reported a satisfactory method of preparing a high quality nano-sized organic-inorganic composite material at a low cost.

SUMMARY OF THE INVENTION

Accordingly, it is an object of the present invention to provide a simple method for preparing a nano-sized composite material of a polymer resin and a layered clay mineral having improved characteristics.

In accordance with one aspect of the present invention, there is provided a method for preparing a nano-sized composite material comprising a polymer resin and a layered clay composite having an organic material incorporated in the interlayer space thereof, wherein the method comprises applying an electric field to a mixture of the polymer resin and the clay composite.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1:
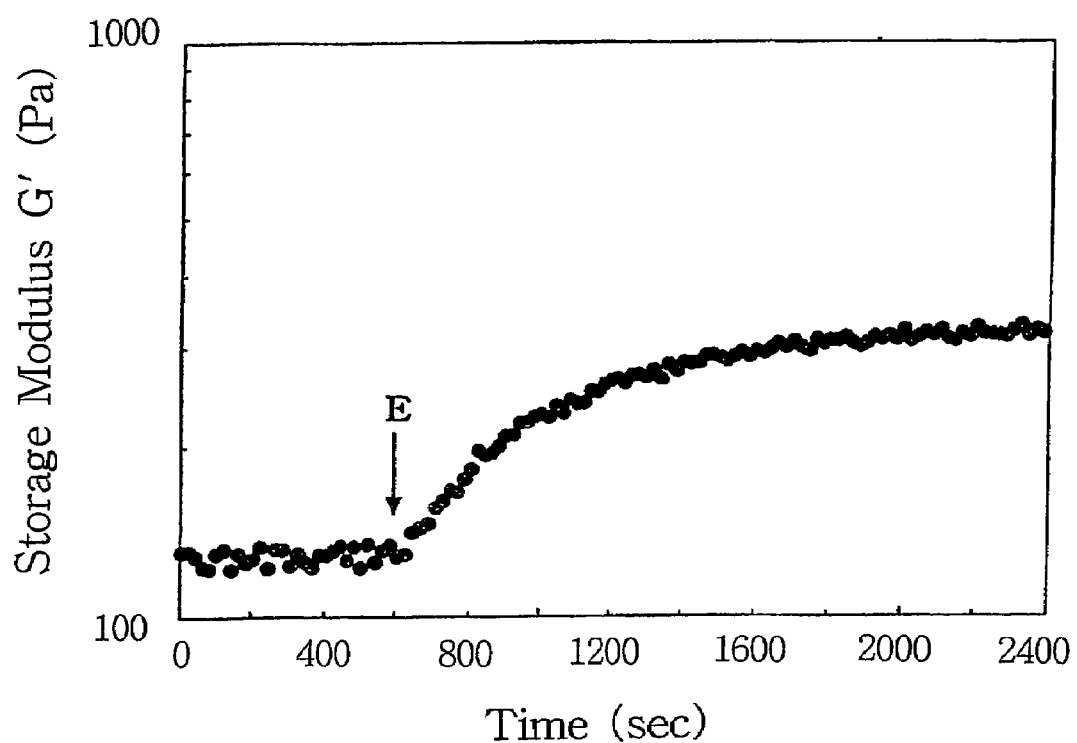
FIGS. 1 and 2: the rheological property (storage modulus) and X-ray diffraction scan of the composite material of Example 1 obtained under an applied electric field, respectively.

Exemplary polymer resins which may be employed in the present invention include polyolefins, polystyrenes, engineering plastics and mixtures thereof.

A layered clay composite used in the present invention may be any one of those clay composites having nanometer-sized lattice units and an organic material incorporated into the interlayer space thereof. Representative examples of the inventive clay composite include hectorite, saponite, montmorillonite and synthetic mica, each having an incorporated organic material, among which montmorillonite substituted with an alkylammonium derivative is preferred. The incorporated organic material, e.g., an alkylammonium derivative, serves to expand the interlayer distance of the clay composite, thereby making it easier for the clay composite to take up the polymer into its interlayer space and to form strong bonds with the matrix polymer.

In the present invention, the clay composite may be used in an amount ranging from 0.01 to 10 parts by weight, preferably from 1 to 5 parts by weight, based on 100 parts by weight of the polymer resin. When the amount is less than 0.01 parts by weight, the desired reinforcing effect becomes insignificant, and when more than 10 parts by weight, the resulting product becomes unmoldable.

The application of an electric field in accordance with the present invention may be executed on a mixture of the polymer resin and the clay composite, which increases the interlayer space of the clay composite, leading to enhanced properties of the formed organic-inorganic composite material. For example, an electric field may be applied to the product obtained by melt-mixing the polymer resin and the clay composite and then extruding the molten mixture through a die in an extruder.

Such an electric field may be applied with an intensity ranging from 10 V/mm to 1000 kV/mm at a temperature higher than the glass transition temperature of the polymer resin. As prolonged application of a strong electric field is liable to bring about decomposition or carbonization of the resin, it should be performed for a sufficiently short time to realize the desired effect.

As described above, the present invention provides a simple and economical method for preparing a nano-sized composite material of a polymer resin and a layered clay compoiste having improved mechanical strength, high heat resistance and high fire retardancy.

The following Examples and Comparative Examples are given for the purpose of illustration only, and are not intended to limit the scope of the invention.

EXAMPLE 1

0.03 parts by weight of a montmorillonite substituted with dimethyl dehydrogenated tallow quaternary ammonium (Cloisite 20A commercially available from Southern Clay Co.) was added to 0.97 parts by weight of a polypropylene powder, which was extruded through a die at 200° C. and a screw rotation speed of 50 rpm using a two-axes extruder having a diameter of ¾ inch. The resulting extrudate was pelletized and molded to obtain a round plate-type sample with a thickness of 1 mm and a diameter of 25 mm.

The sample was fixed in rheological property measuring apparatus (RMS800 commercially available from Rheometric Co.) and an electric field of 1 kV/mm was applied thereto using 60 Hz alternating current (AC) at 180° C. The rheological property of the treated sample was measured under a predetermined strain value of 10% and a sample movement rate of frequency 1 rad/s, in a dynamic viscosity and elasticity mode. The X-ray diffraction. pattern of the sample was measured using an XRD apparatus (Rint2000 commercially available from Rigaku Co.). The rheological property (storage modulus) and X-ray diffraction scan thus obtained are shown in FIGS. 1 and 2, respectively.

Figure 2:
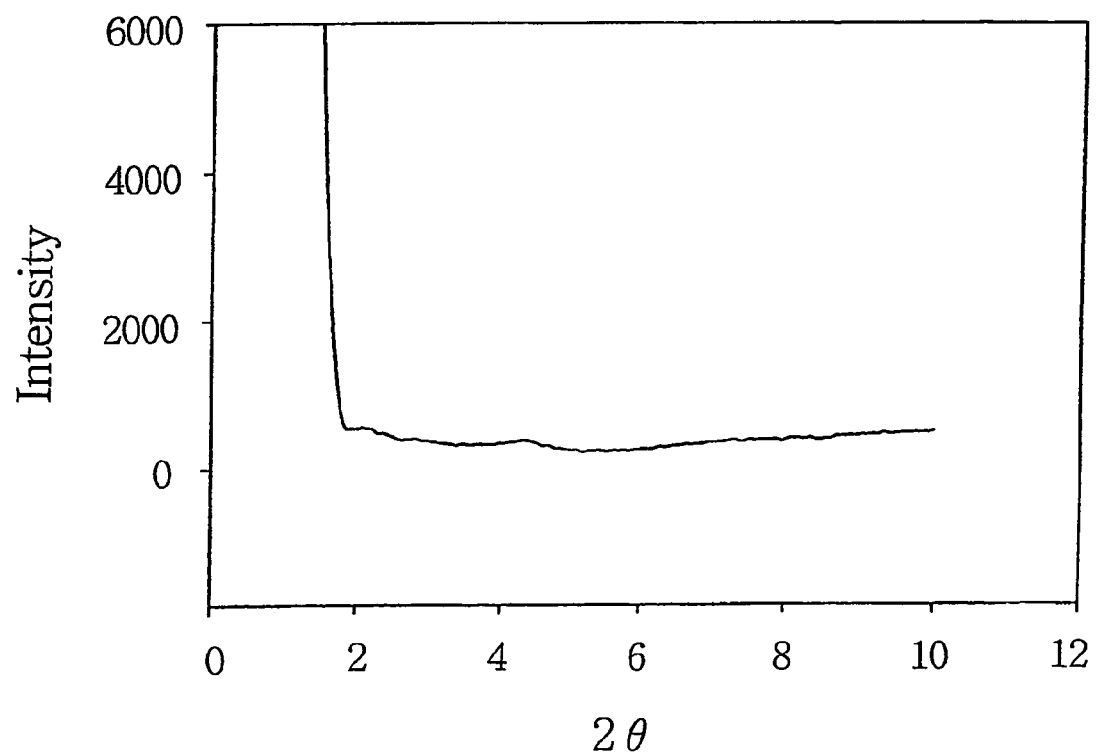

As shown in FIG. 1, the storage modulus (G') value changed from 120 Pa to 300 Pa after the exposure to electric field. FIG. 2 shows that the characteristic peaks of montmorrillonite observed before the electric field treatment (see FIG. 3) disappeared after the treatment.

COMPARATIVE EXAMPLE 1

The procedure of Example 1 was repeated except for the electric field treatment, to obtain a round plate-type sample.

Figure 3:
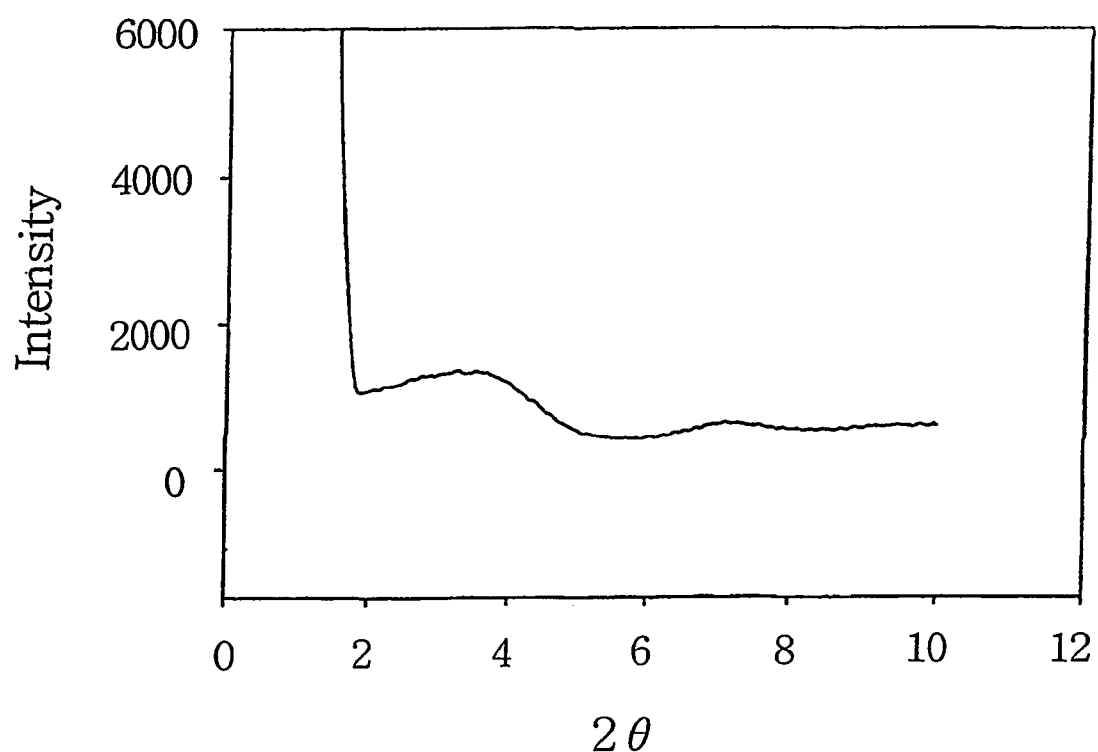
FIG. 3: the X-ray diffraction scan of the composite material of Comparative Example 1 obtained under no applied electric field.

The rheological property (storage modulus) of the sample thus obtained is shown in FIG. 3, which exhibits that the storage modulus (G') value was 80 Pa. The X-ray diffraction scan thereof clearly shows the characteristic peaks of montmorillonite.

EXAMPLE 2

The procedure of Example 1 was repeated except that 0.05 parts by weight of montmorillonite substituted with dimethyl dehydrogenated tallow quaternary ammonium and 0.95 parts by weight of polypropylene were used, to obtain a round plate-type sample, which was subjected to the electric field treatment as in Example 1.

Figure 4:
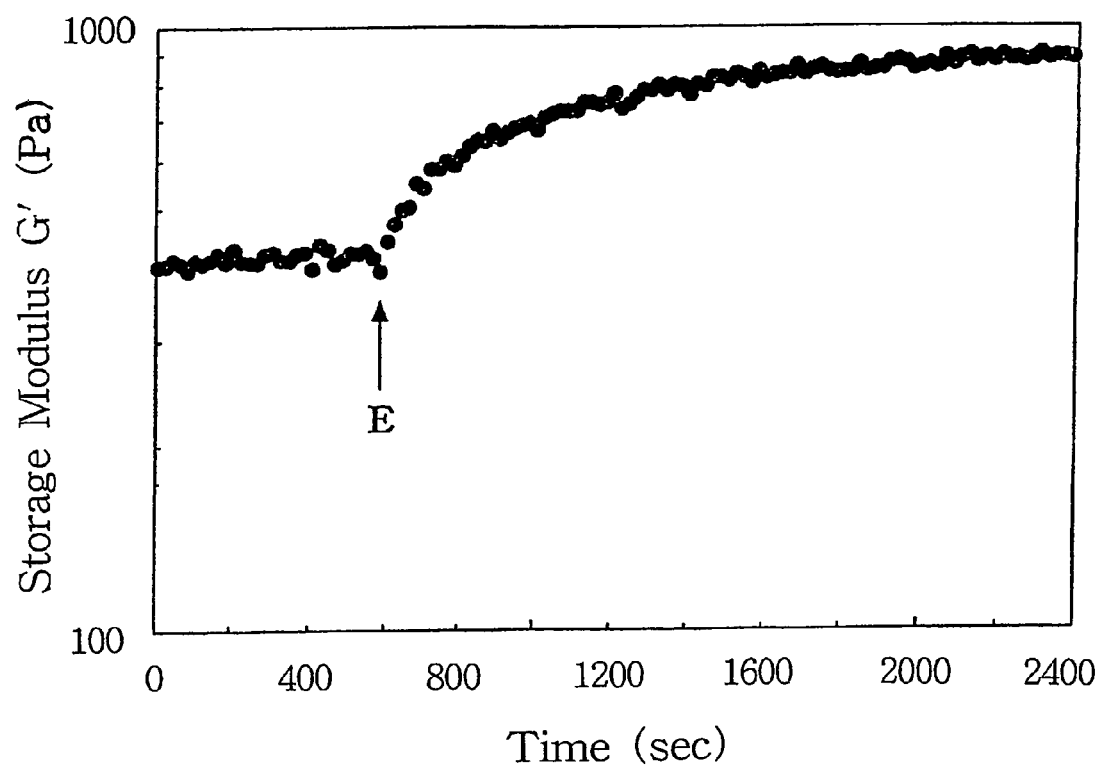
FIGS. 4 to 7: the rheological properties (storage modulus) of the respective composite materials of Examples 2 to 5 obtained under an applied electric field.

The rheological property (storage modulus) of the sample thus obtained is shown in FIG. 4, which exhibits that the storage modulus (G') value changed from 400 Pa to 900 Pa after the electric field treatment. The X-ray diffraction scan thereof reveals that the characteristic montmorillonite peaks disappeared after the electric field treatment.

EXAMPLE 3

The procedure of Example 1 was repeated except that an electric field of 2 kV/mm was applied using 60 Hz AC, to obtain a round plate-type sample.

Figure 5:
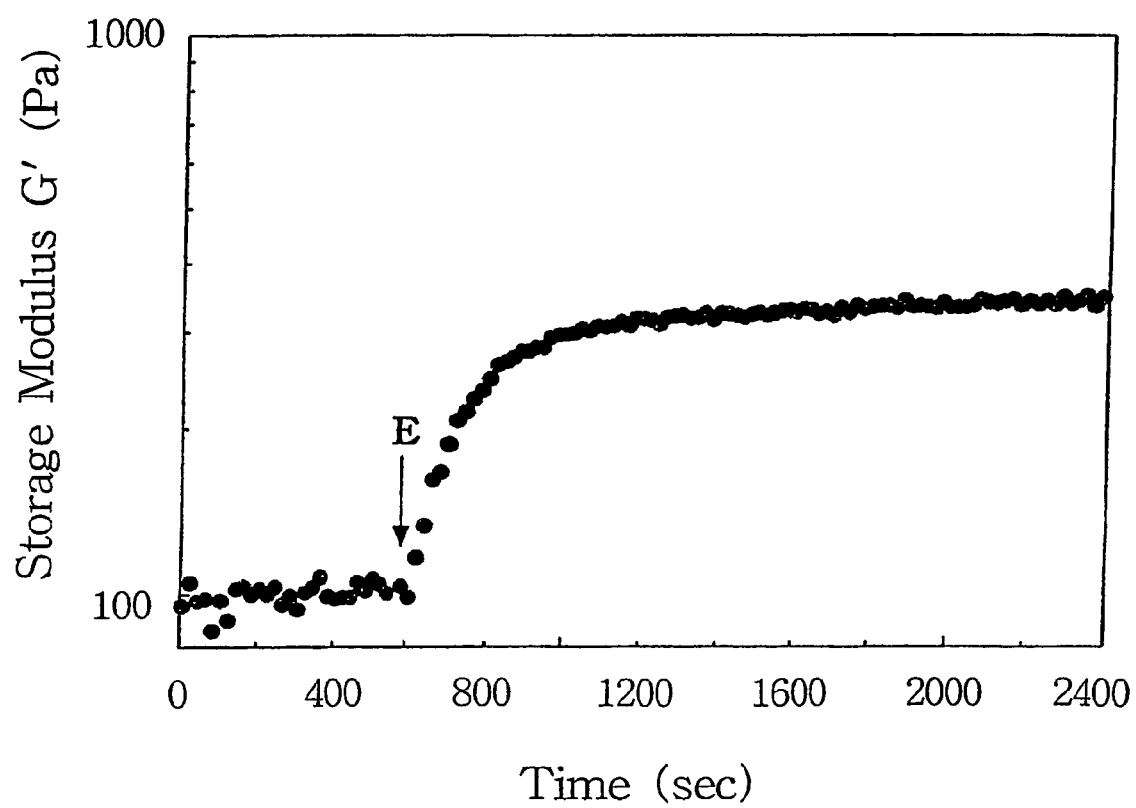

The rheological property (storage modulus) of the sample thus obtained is shown in FIG. 5, which exhibits that the storage modulus (G') value changed from 100 Pa to 300 Pa after the electric field treatment. The X-ray diffraction scan thereof shows that the characteristic montmorillonite peaks disappeared after the electric field treatment.

EXAMPLE 4

The procedure of Example 1 was repeated except that an electric field of 1 kV/mm was applied using 1 Hz AC, to obtain a round plate-type sample.

Figure 6:
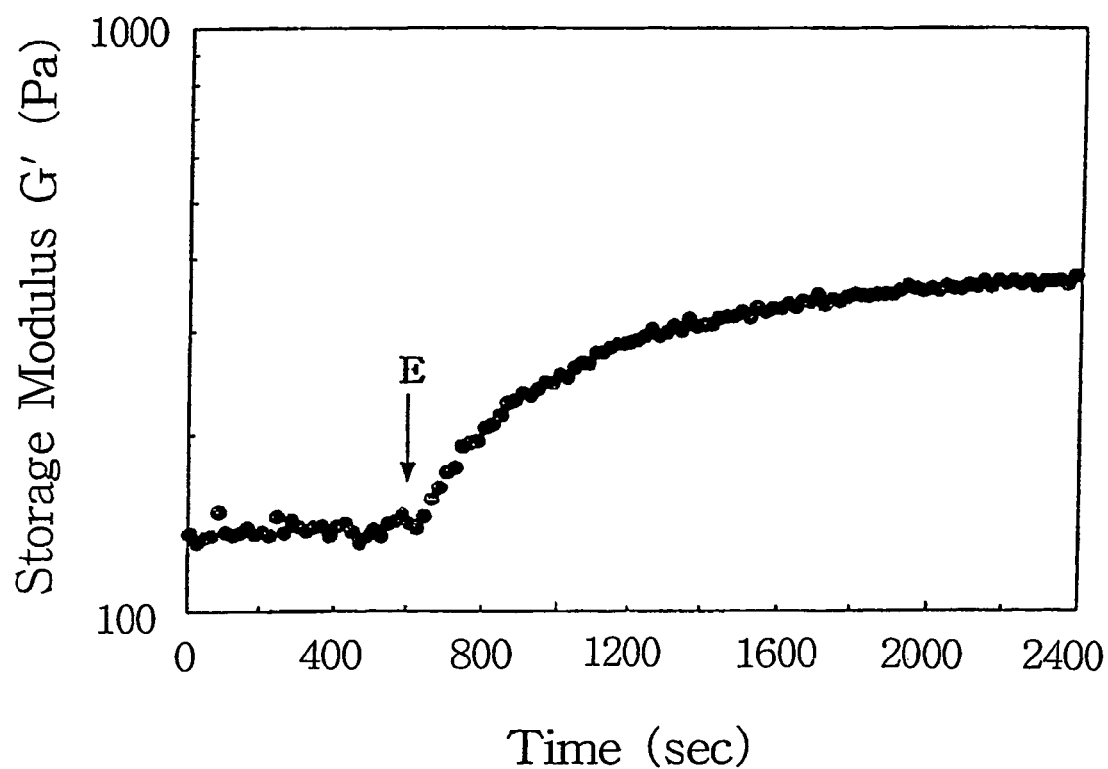

The rheological property (storage modulus) of the sample thus obtained is shown in FIG. 6, which exhibits that the storage modulus (G') value changed from 120 Pa to 300 Pa after the electric field treatment. The X-ray diffraction scan thereof shows that the characteristic montmorillonite peaks disappeared after the electric field treatment.

EXAMPLE 5

The procedure of Example 1 was repeated except that an electric field of 1 kV/mm was applied using 1000 Hz AC, to obtain a round plate-type sample.

Figure 7:
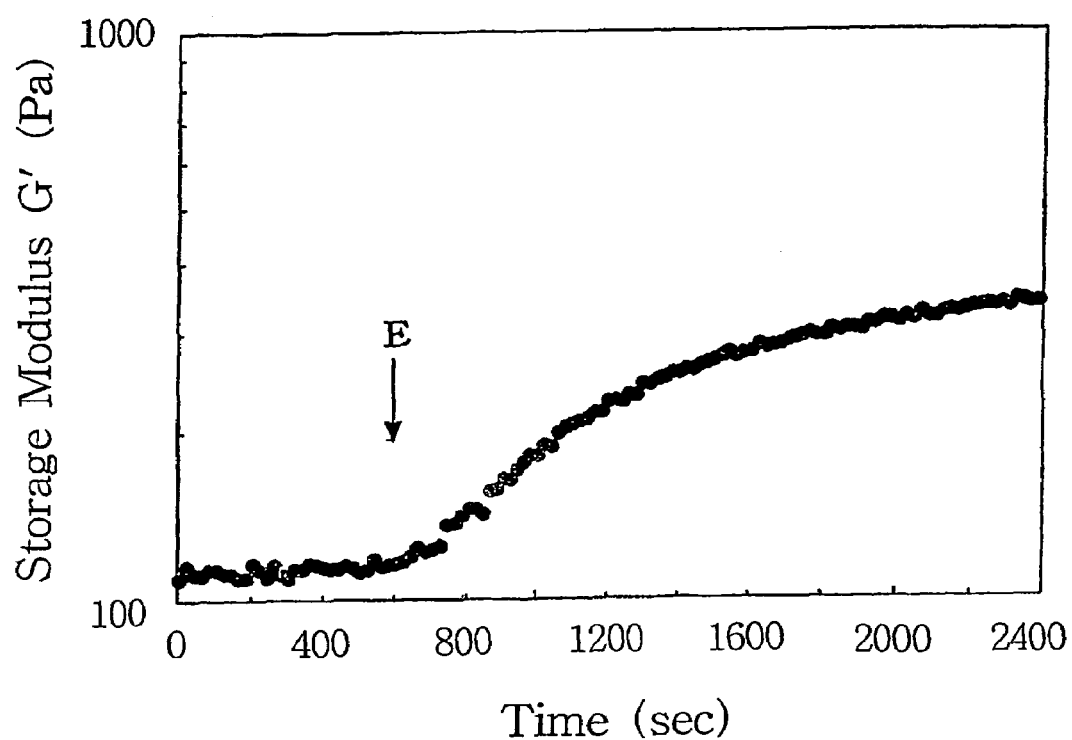

The rheological property (storage modulus) of the sample thus obtained is shown in FIG. 7, which exhibits that the storage modulus (G') value changed from 110 Pa to 300 Pa after the electric field treatment. The X-ray diffraction scan thereof shows that the characteristic montmorillonite peaks disappeared after the electric field treatment.

COMPARATIVE EXAMPLE 2

The procedure of Example 1 was repeated except that montmorillonite was not added to polypropylene, to obtain a round plate-type sample.

Figure 8:
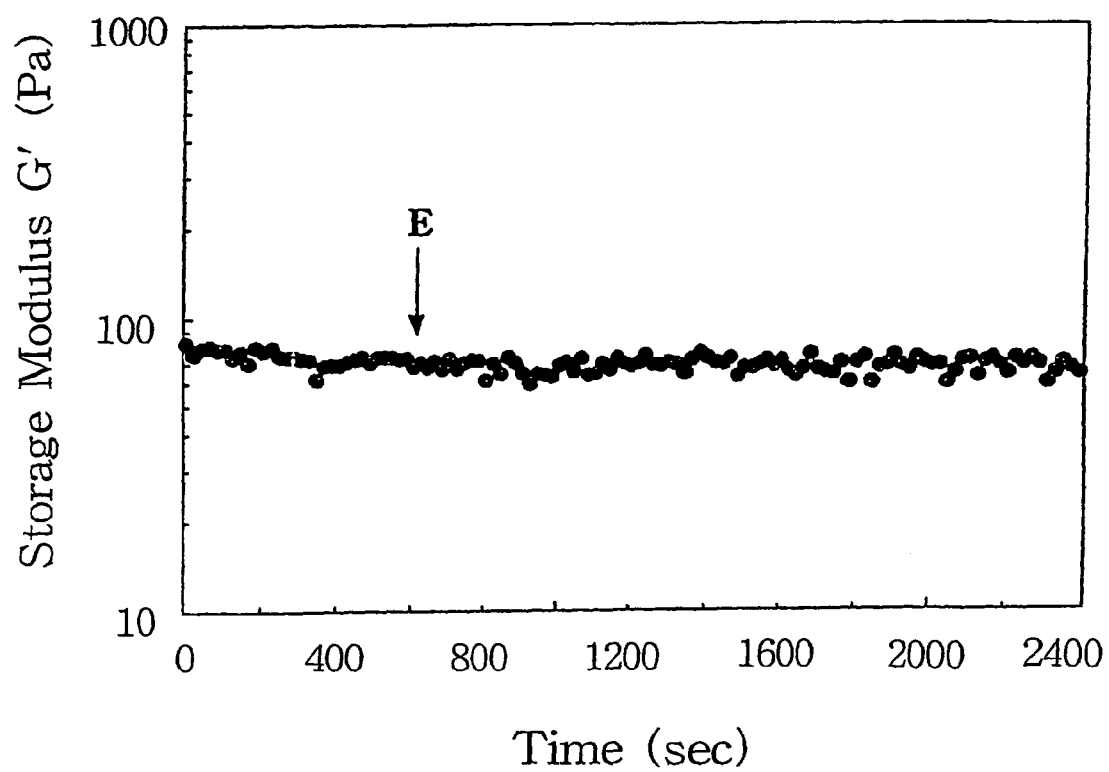
FIG. 8: the rheological property (storage modulus) of the polymer resin extrudate of Comparative Example 2 obtained under an applied electric field.

The rheological property (storage modulus) of the sample thus obtained is shown in FIG. 8, which exhibits that the storage modulus (G') value did not change after the electric field treatment.

COMPARATIVE EXAMPLE 3

The procedure of Example 1 was repeated except that montmorillonite having no organic substituent was used, to obtain a round plate-type sample.

Figure 9:
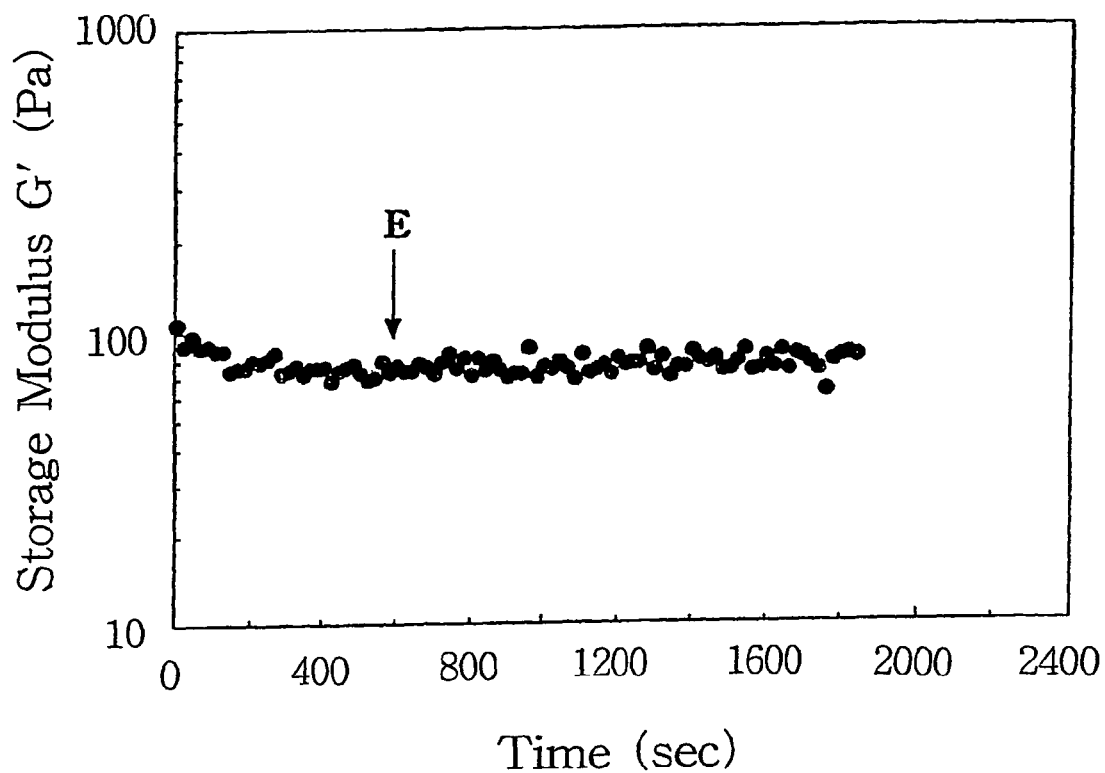
FIG. 9: the rheological property (storage modulus) of the composite material of Comparative Example 3 obtained under an applied electric field.

The rheological property (storage modulus) of the sample thus obtained is shown in FIG. 9, which exhibits that the storage modulus (G') value did not change after the electric field treatment. The X-ray diffraction scan thereof clearly shows the characteristic peaks of montmorillonite even after the electric field treatment.

As described above, in accordance with the method of the present invention, a nano-sized composite material of a polymer resin and a layered clay composite having improved mechanical strength, high heat resistance and high fire retardancy can be easily prepared economically.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing a nano-sized composite material consisting essentially of a polymer resin and a layered clay composite having an organic material incorporated in the interlayer space thereof, wherein the method comprises applying an electric field to a mixture of the polymer resin and the clay composite, increasing the interlayer space of the clay composite.

2. The method of claim 1, wherein the polymer resin is selected from the group consisting of a polyolefin, polystyrene, engineering plastic and a mixture thereof.

3. The method of claim 1, wherein the clay composite is selected from the group consisting of hectorite, saponite, montmorillonite and synthetic mica.

4. The method of claim 3, wherein the clay composite is montmorillonite and the organic material is an alkylammonium derivative.

5. The method of claim 1, wherein the clay composite is used in an amount ranging from 0.01 to 10 parts by weight based on 100 parts by weight of the polymer resin.

6. The method of claim 1, wherein the electric field is applied at a temperature higher than the glass transition temperature of the polymer resin.

7. The method of claim 1, wherein the applied electric field is in the range of 10 V/mm to 1000 kV/mm.

* * * * *